UNITED STATES PATENT OFFICE.

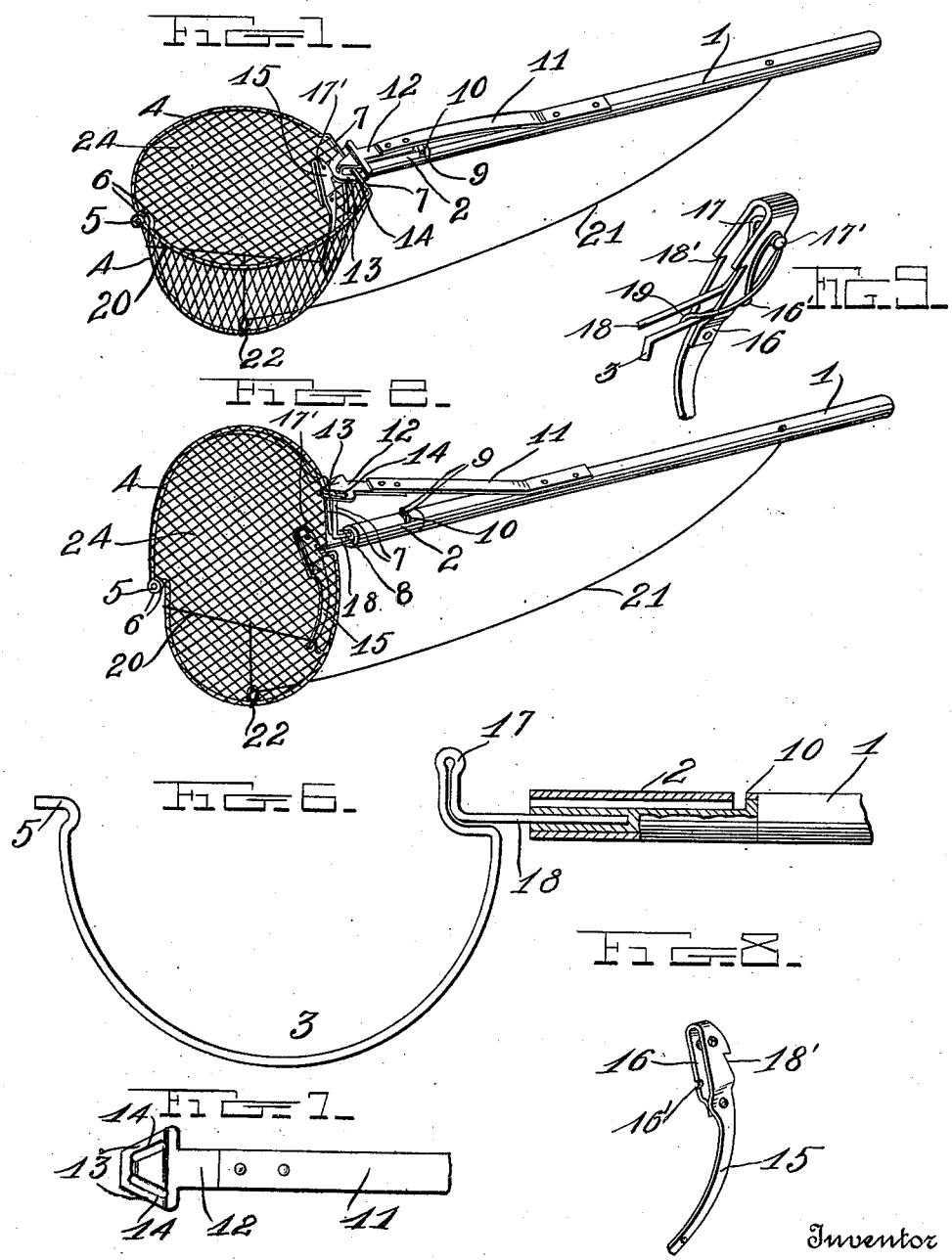

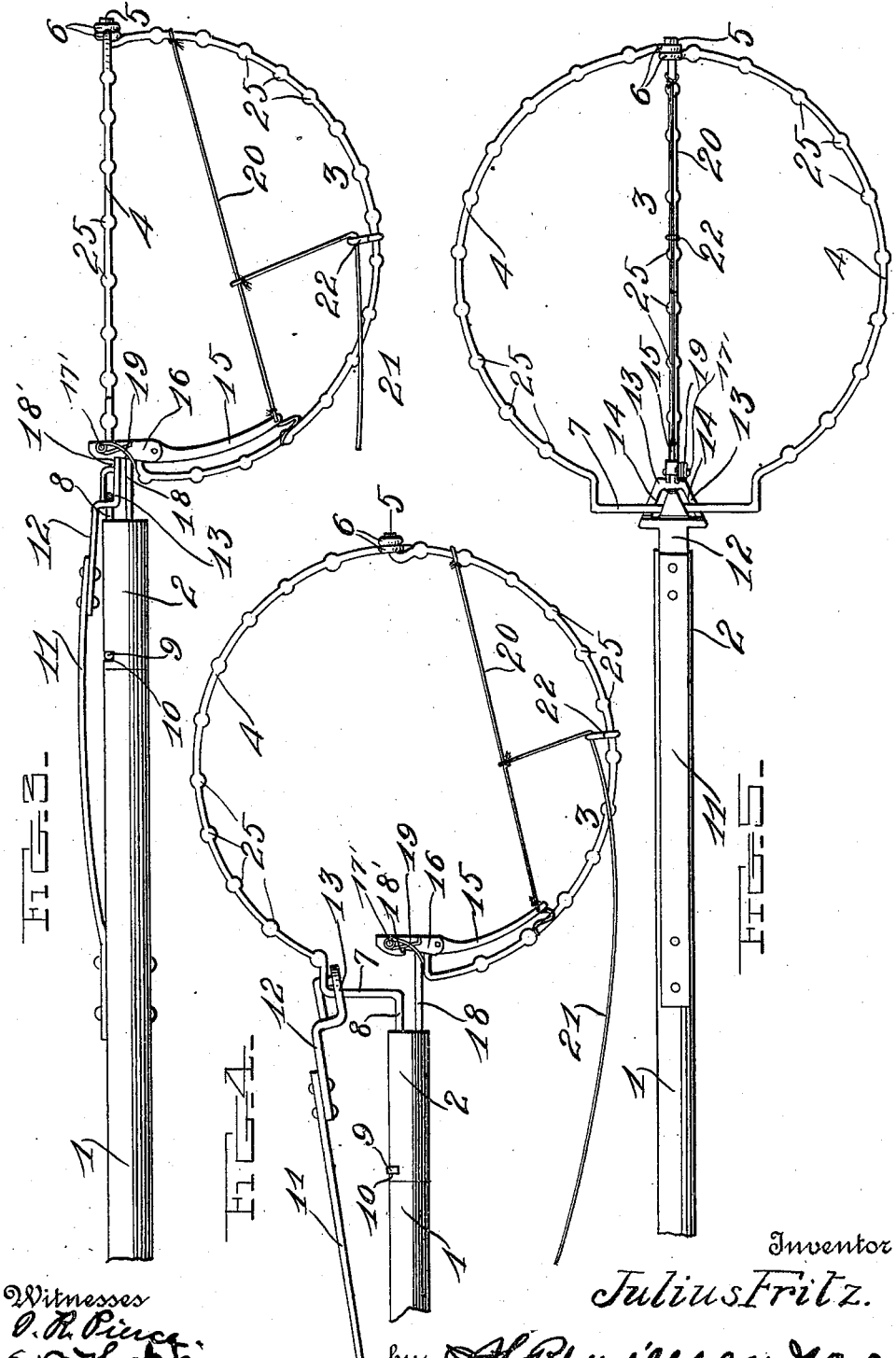

JULIUS FRITZ, OF PETALUMA, CALIFORNIA.

TRAP-NET.

996,234.  Specification of Letters Patent. Patented June 27, 1911.

Application filed December 8, 1910. Serial No. 596,264.

*To all whom it may concern:*

Be it known that I, JULIUS FRITZ, a citizen of the United States, residing at Petaluma, in the county of Sonoma and State of California, have invented certain new and useful Improvements in Trap-Nets; and I do declare the following to be a full, clear, and exact description of the invention, such as will enable others skilled in the art to which it appertains to make and use the same.

This invention relates to improvements in trap nets.

One object of the invention is to provide a hand net having an improved construction and arrangement of spring actuated jaws which when sprung will normally close together over the object being caught.

Another object is to provide a trap net of this character which will be simple, strong, durable and inexpensive in construction and provided with means whereby the same may be both automatically and manually operated.

With these and other objects in view, the invention consists of certain novel features of construction, combination and arrangement of parts as will be more fully described and particularly pointed out in the appended claims.

In the accompanying drawings: Figure 1 is a perspective view of the net in open or set position; Fig. 2 is a similar view in closed position; Fig. 3 is an enlarged side view of the frame and handle with the netting removed and the jaws in open position; Fig. 4 is a similar view with the jaws in closed position; Fig. 5 is a top plan view of the frame and handle with the jaws in open position and the netting removed; Fig. 6 is a detail view of the outer end of the handle and the jaw supporting frame; Fig. 7 is a plan view of the jaw engaging and operating plate and outer end of the spring; Fig. 8 is a detail perspective view of the catch lever for holding the jaws in open position; Fig. 9 is an enlarged perspective view of the inner end of the jaw supporting frame showing more clearly the construction and arrangement of the spring catch for holding the jaws in open position.

Referring more particularly to the drawings, 1 denotes the handle of the net on the outer end of which is arranged a ferrule. Secured in the outer end of the handle is the fixed or stationary part 3 of the net holding frame, said part forming a support for the outer ends of the movable or jaw members 4 of the frame. The stationary part 3 and jaw members 4 of the net frame are preferably of bowed or substantially semi-circular form whereby when the jaws are closed together a substantially circular frame will be formed. The outer end of the stationary part 3 of the frame is bent outwardly at substantially right angles to form a bearing stud 5 with which are pivotally engaged eyes 6 formed on the adjacent outer ends of the frames 4 forming the jaw members of the net. The inner ends of the rods forming the jaw members are offset and formed straight for a short distance as at 7, said straight portions of the rods then being bent rearwardly at right angles to form jaw attaching and pivoting members 8 which are pivotally engaged with a longitudinal recess formed in the upper portion of the handle below the upper side of the ferrule 2. The inner ends of the pivot members 8 are bent upwardly to form lugs 9 which are adapted to engage and work in a transverse slot 10 formed in the upper side of the ferrule near its inner end as shown. By thus pivotally connecting the inner and outer ends of the jaw members 4 the latter will be securely held in operative position on the lower frame portion 3 and handle 1 of the net.

Secured to the upper side of the handle 1 near its outer end is a flat longitudinally extending spring 11 to the outer end of which is secured a jaw operating plate 12, said plate having an offset substantially triangular head having depressed side edges 13 in which are formed slots 14 arranged at an angle to each other through which the straight portions 7 of the inner ends of the jaw rods pass before entering the handle.

By thus engaging the straight portions of the jaw rods with the slotted plate 12 the pressure of the spring 11 will be exerted to force the plate upwardly and thereby bring the jaw rods together and thus close the same, and the upper portion of the net.

In order to hold the jaw closing plate in inoperative position, I provide a suitable catch in the form of a curved arm or lever 15 having its upper end bent upon itself to form a loop 16 which is adapted to engage an eye 17 formed on the inner end of the rod forming the stationary part 3 of the frame where said part is joined to its attaching shank 18. The eye 17 is formed by offsetting the inner end of the stationary jaw rod 3 and bending the offset portion upon itself and at right angles to the shank 18 as clearly shown in Fig. 6 of the drawing. The loop 16 is pivotally connected to the eye 17 by a pivot pin 17' and in the rear edge of the portion of the lever 15 is formed a notch 18' which is adapted to be engaged by the outer edge of the jaw operating plate 12 when the latter is pressed down to bring the jaws to an open position.

Arranged on one end of the pivot pin 17' which connects the loop 16 with the eye 17 is a spring 19 one end of which is engaged with a notch 16' in the outer edge of the loop 16 while the inner end is secured between the shank 18 and the inner offset portion of the stationary frame 3, as shown in Figs. 3, 4 and 9 of the drawings. By thus arranging the spring 19 the pressure of the same is exerted to hold the loop in position to permit the notch 18' therein to catch the forward edge of the plate 12 when the latter is pressed down to open the jaws.

Arranged across the lower portion of the frame member 3 is a trip cord 20 to which is secured the lower end of the jaw holding lever 15. By thus arranging the cord 20 an object such as an animal or bird entering the net and coming into engagement with the cord will trip the lever 15 and thus release the jaw holding plate and permit the same by the action of the spring 11 to close the jaws and upper portion of the net over the object. To the trip cord 20 is also connected a hand releasing cord 21 which passes through an eye 22 secured to the stationary frame member 3 and extends back and is suitably secured to the handle near the inner end thereof whereby the lever 15 may be tripped by the operator as when catching insects or other objects which would be too light to spring the trap by coming into engagement with the trip cord 20.

On the stationary member 3 of the frame and secured to the jaw members 4 is a covering 24 formed of netting or other suitable material. The netting or covering 24 has sufficient fullness or is large enough to permit the sides thereof to sag slightly and thus form a bag. The wire rod forming the frame portion 3 and jaw member is preferably punched at intervals to form a series of lateral projections or lugs 25 which prevent the edges of the netting from slipping around on the rods when secured thereto.

By means of a net constructed in accordance with my invention, insects, birds and small animals may be readily caught without injury and by arranging the tripping mechanism of the jaw members of the net as shown the latter may be used by hand or set for catching objects by means of a decoy or bait in the manner described.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a trap net, a handle, a stationary frame member secured thereto, jaw members pivotally connected to said handle and to the outer end of said frame member, a bearing eye formed on the inner end of said frame member, a spring retracted lever, a jaw closing plate having an operative engagement with the inner ends of said jaw members, an operating spring secured to said plate and to said handle, a catch pivotally mounted on the eye of said frame member and adapted to engage said plate when depressed to open the jaw thereby holding said jaws in an open position, a lever formed on said catch, a trip cord connected to said lever whereby the latter will be actuated by an object entering the net and a releasing cord connected to said trip cord whereby the catch may be released by the operator.

2. A trap net comprising a handle, a ferrule arranged on the outer end of said handle, said ferrule having formed therein a transverse slot, a stationary frame member secured to the outer end of the handle, jaw members having a pivotal connection at their outer ends with the outer end of said frame member, said jaw members having straight inner portions, right angularly bent pivot members adapted to pivotally engage the ferrule on the outer end of the handle, stop lugs formed on the inner ends of said pivot members, said stop lugs being adapted to engage the slot in said ferrule, a spring actuated jaw closing plate, a pivoted catch adapted to engage said plate and hold the jaws in open position, means whereby said catch is released by an object entering the net, means whereby the catch may be tripped by the operator, a covering arranged over said frame and jaw member, and projections formed on said frame and jaw members whereby the edges of the net are prevented from slipping around thereon when secured thereto.

In testimony whereof I have hereunto set my hand in presence of two subscribing witnesses.

JULIUS FRITZ.

Witnesses:
 J. H. OETTJEN.
 JACOB E. JACOBSEN.

Copies of this patent may be obtained for five cents each, by addressing the "Commissioner of Patents, Washington, D. C."